(12) United States Patent
Kim et al.

(10) Patent No.: US 9,900,663 B2
(45) Date of Patent: Feb. 20, 2018

(54) DISPLAY APPARATUS AND CONTROL METHOD THEREOF

(71) Applicant: SAMSUNG ELECTRONICS CO., LTD., Suwon-si (KR)

(72) Inventors: Chang-won Kim, Gwangju-si (KR); Young-chun Ahn, Bucheon-si (KR); Sang-wook Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 14/496,590

(22) Filed: Sep. 25, 2014

(65) Prior Publication Data

US 2015/0256891 A1 Sep. 10, 2015

(30) Foreign Application Priority Data

Mar. 5, 2014 (KR) ........................ 10-2014-0025970

(51) Int. Cl.
| | |
|---|---|
| *H04N 21/439* | (2011.01) |
| *H04N 21/482* | (2011.01) |
| *H04N 21/485* | (2011.01) |
| *H04N 21/84* | (2011.01) |
| *H04N 21/44* | (2011.01) |

(Continued)

(52) U.S. Cl.
CPC ......... *H04N 21/4826* (2013.01); *H04N 5/602* (2013.01); *H04N 21/4345* (2013.01); *H04N 21/4394* (2013.01); *H04N 21/44008* (2013.01); *H04N 21/4852* (2013.01); *H04N 21/4854* (2013.01); *H04N 21/8402* (2013.01)

(58) Field of Classification Search
CPC ........... H04N 21/4532; H04N 21/4826; H04N 21/44222; H04N 21/44543; H04N 21/4668; H04N 21/4394; H04N 21/4852; H04N 21/44008; H04N 21/4854; H04N 21/4345; H04N 21/8402; H04N 5/602
See application file for complete search history.

(56) References Cited

U.S. PATENT DOCUMENTS

| | | |
|---|---|---|
| 6,188,439 B1 | 2/2001 | Kim |
| 6,342,925 B1 | 1/2002 | Akhavan et al. |

(Continued)

FOREIGN PATENT DOCUMENTS

| | | |
|---|---|---|
| EP | 2495962 A1 | 9/2012 |
| JP | 2006245745 A | 9/2006 |

(Continued)

OTHER PUBLICATIONS

Communication dated May 11, 2015, issued by the European Patent Office in counterpart European Patent Application No. 15150962.7.

*Primary Examiner* — Benjamin R Bruckart
*Assistant Examiner* — Aklil Tesfaye
(74) *Attorney, Agent, or Firm* — Sughrue Mion, PLLC (57) ABSTRACT

A display apparatus is provided. The display apparatus includes a receiver configured to receive content and metadata including genre information of the content, a controller configured to extract the genre information from the metadata, and calculate reliability of the genre information by analyzing the content and comparing the analyzed content with the genre information, and a video processor configured to process a video of the content according to the calculated reliability.

12 Claims, 9 Drawing Sheets

(51) Int. Cl.
*H04N 21/434* (2011.01)
*H04N 5/60* (2006.01)

(56) References Cited

U.S. PATENT DOCUMENTS

| | | | |
|---|---|---|---|
| 2008/0068509 A1 | 3/2008 | Nishimura | |
| 2008/0256576 A1* | 10/2008 | Nesvadba | H04H 60/59 |
| | | | 725/39 |
| 2009/0064267 A1* | 3/2009 | Lee | H04N 21/435 |
| | | | 725/149 |
| 2009/0268960 A1* | 10/2009 | Imai | H04N 5/57 |
| | | | 382/162 |
| 2012/0266195 A1* | 10/2012 | Nakano | G06F 17/30722 |
| | | | 725/53 |
| 2014/0201113 A1* | 7/2014 | Harz | G06N 99/005 |
| | | | 706/12 |
| 2015/0058877 A1* | 2/2015 | Lakkundi | H04N 21/439 |
| | | | 725/19 |

FOREIGN PATENT DOCUMENTS

| | | |
|---|---|---|
| JP | 2008-153895 A | 7/2008 |
| KR | 10-2007-0015755 A | 2/2007 |
| KR | 10-2008-0099011 A | 11/2008 |
| KR | 10-2009-0022373 A | 3/2009 |
| KR | 10-1260941 B1 | 5/2013 |
| WO | 2008142616 A1 | 11/2008 |

\* cited by examiner

|  | VIDEO MODE | AUDIO MODE |
|---|---|---|
| GENRE 1 | VIDEO MODE 1 | AUDIO MODE 1 |
|  | ⋮ |  |
| GENRE N | VIDEO MODE N | AUDIO MODE N |
| Commercial | VIDEO MODE C | AUDIO MODE C |

DISPLAY APPARATUS AND CONTROL METHOD THEREOF

CROSS-REFERENCE TO RELATED APPLICATION

This application claims priority from Korean Patent Application No. 10-2014-0025970, filed in the Korean Intellectual Property Office on Mar. 5, 2014, the disclosure of which is incorporated herein by reference in its entirety.

BACKGROUND

Technical Field

Apparatuses and methods consistent with exemplary embodiments relate to a display apparatus and a control method thereof, and more particularly, to a display apparatus which processes a video and an audio according to a genre of content, and a control method thereof.

Description of the Related Art

With the development of electronic technologies, various kinds of display apparatuses have been developed and distributed. The display apparatus is equipped with a variety of functions to live up to the expectations of users. Accordingly, users of display apparatuses can view various kinds of content via various kinds of display apparatuses including televisions (TVs).

In particular, a recent display apparatus enables a user to directly control a screen and a sound according to a content which is replayed in the display apparatus, and thus the user can view the content that the user wants to view with optimal video and audio.

For example, when broadcasting stations, which provide various broadcast content, provide programs of various genres such as news, a commercial, a sport, a movie, a drama, a documentary, etc., the TV user can view the content with high quality video and audio by selecting video and audio playback modes optimized for the genre of the program that the user wants to view, or by directly adjusting video and audio playback setting values.

However, it is difficult for the user to adjust the screen or sound for every content. Therefore, most of the users view all content only by a single adjusting operation. That is, the function of adjusting the video or audio is not well utilized.

Therefore, there is a demand for a method for automatically adjusting a video and an audio of a display apparatus exactly according to a genre of content without requiring a user to directly adjust the video and audio.

SUMMARY

One or more exemplary embodiments may overcome the above disadvantages and other disadvantages not described above. However, it is understood that one or more exemplary embodiment are not required to overcome the disadvantages described above, and may not overcome any of the issues described above.

One or more exemplary embodiments provide a display apparatus which can automatically and exactly process a video and an audio corresponding to a genre of a replayed content by using a result of calculating reliability of genre information of the content included in metadata of the content, and a control method thereof.

According to an aspect of an exemplary embodiment, there is provided a display apparatus including a receiver configured to receive content and metadata including genre information of the content, a controller configured to extract the genre information from the metadata, and calculate reliability of the genre information by analyzing the content and comparing the analyzed content with the genre information, and a video processor configured to process a video of the content according to the calculated reliability.

The display apparatus may further include a storage configured to store genre identification characteristic values corresponding to a plurality of content genres, and wherein the controller is further configured to calculate the reliability of the genre information by comparing a first genre identification characteristic value corresponding to the genre information, which is acquired from the storage, and a second genre identification characteristic value which is acquired by analyzing the content.

The first genre identification characteristic value and the second genre identification characteristic value may include at least one of a shot characteristic, a motion characteristic, a brightness characteristic, a color characteristic, an edge characteristic, a text characteristic, and a saturation characteristic related to the video of the content.

The storage may be further configured to store video setting values for a plurality of video modes corresponding to the plurality of content genres, and wherein the controller may be further configured to determines a genre of the content according to the reliability of the genre information, and control the video processor to process the video of the content by using one of the video setting values on a video mode from the plurality of video modes corresponding to the determined genre of the content, which is acquired from the storage.

In response to the reliability of the genre information exceeding a predetermined value, the controller may be further configured to determine that the genre information indicates the genre of the content, and process the video of the content according to the video mode of the plurality of video modes corresponding to the genre of the content, and wherein, in response to the reliability of the genre information being less than the predetermined value, the controller may be further configured to determine that the genre information does not indicate the genre of the content and control the video processor to process the video of the content according to a predetermined video mode.

The controller may be further configured to calculate a probability for each of the plurality of content genres by comparing the first genre identification characteristic values corresponding the plurality of content genres stored in the storage, and the second genre identification characteristic value which is acquired by analyzing the content, and wherein, in response to the reliability of the genre information exceeding a predetermined value, the controller may be further configured to determine that the genre information indicates the genre of the content, and processes the video of the content according to the video mode of the plurality of video modes corresponding to the genre of the content, and wherein, in response to the reliability of the genre information of the content being less than the predetermined value, the controller may be further configured to determine that the genre having a highest probability from among the probabilities of the plurality of content genres is the genre of the content, and control the video processor to process the video of the content according to a video mode corresponding to the determined genre.

The display apparatus may further include a communicator configured to communicate with an external server, wherein the metadata including the genre information is received from the external server.

The display apparatus may further include an audio processor configured to process an audio of the content, wherein the storage is further configured to store audio setting values for a plurality of audio modes corresponding to the plurality of content genres, wherein the controller is further configured to control the video processor and the audio processor to process the video and the audio of the content by using one of the video setting values on the video mode from the plurality of video modes and an audio setting value on an audio mode corresponding to the determined genre of the content.

The content may be a broadcast content, and the metadata is Electronic Program Guide (EPG) information of the broadcast content.

According to an aspect of another exemplary embodiment, there is provided a control method of a display apparatus, the control method including receiving content and metadata including genre information of the content, extracting the genre information from the metadata and calculating reliability of the genre information by analyzing the content and comparing the analyzed content with the genre information, and processing a video of the content according to the calculated reliability.

The calculating the reliability of the genre information of the content may include calculating the reliability by comparing a first genre identification characteristic value corresponding to the genre information, which is acquired from among pre-stored genre identification characteristic values corresponding to a plurality of content genres, and a second genre identification characteristic value which is acquired by analyzing the content.

The first genre identification characteristic value and the second genre identification characteristic value may include at least one of a shot characteristic, a motion characteristic, a brightness characteristic, a color characteristic, an edge characteristic, a text characteristic, and a saturation characteristic related to the video of the content.

The processing the video may include determining a genre of the content according to the reliability of the genre information, and processing the video of the content by using a video setting value on a video mode corresponding to the determined genre of the content, which is acquired from among pre-stored video setting values on a plurality of video modes corresponding to the plurality of content genres.

The processing the video may include in response to the reliability of the genre information exceeding a predetermined value, determining that the genre information indicates the genre of the content, and processing the video of the content according to the video mode corresponding to the genre of the content, and in response to the reliability of the genre information being less than the predetermined value, determining that the genre information does not indicate the genre of the content and processing the video of the content according to a predetermined video mode.

The control method may further include calculating a probability for each of the plurality of content genres by comparing the pre-stored first genre identification characteristic values corresponding the plurality of content genres, and the second genre identification characteristic value which is acquired by analyzing the content, and wherein the processing the video may include in response to the reliability of the genre information exceeding a predetermined value, determining that the genre information indicates the genre of the content, and processing the video of the content according to the video mode corresponding to the genre of the content, and in response to the reliability of the genre information of the content being less than the predetermined value, determining that the genre having a highest probability from among the probabilities of the plurality of content genres is the genre of the content, and processing the video of the content according to a video mode corresponding to the determined genre.

The metadata including the genre information may be received from an external server.

The control method may further include processing an audio of the content by using an audio setting value on an audio mode corresponding to the determined genre, which is acquired from among pre-stored audio setting values on a plurality of audio modes corresponding to the plurality of content genres.

The content may be a broadcast content, and the metadata may be Electronic Program Guide (EPG) information of the broadcast content.

According to the various exemplary embodiments described above, even when there is an error in genre information of a content included in metadata of the content, an exact genre of the replayed content can be determined by using a result of calculating reliability of the genre information of the content. Therefore, the user can view a video and an audio optimized for the genre of the content more easily and exactly.

BRIEF DESCRIPTION OF THE DRAWINGS

The above and/or other aspects will become apparent and readily appreciated from the following description of exemplary embodiments taken in conjunction with the accompanying drawings, in which.

DETAILED DESCRIPTION OF EXEMPLARY EMBODIMENTS

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail because they would obscure the exemplary embodiments with unnecessary detail.

Figure 1:
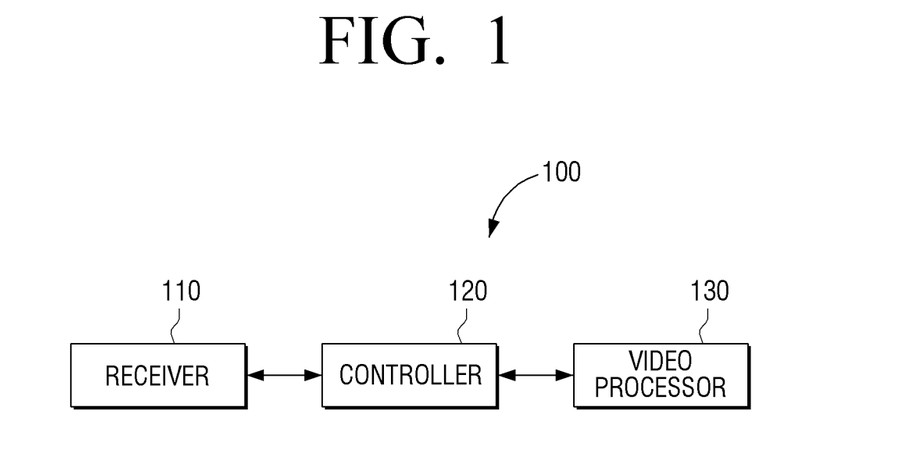
FIG. 1 is a block diagram illustrating a configuration of a display apparatus according to an exemplary embodiment.

FIG. 1 is a block diagram illustrating a configuration of a display apparatus according to an exemplary embodiment. The display apparatus 100 may be a television (TV). However, this is merely an example and the display apparatus 100 may be various kinds of display apparatuses such as a mobile phone, a notebook computer, a monitor, an electronic album, etc.

Referring to FIG. 1, the display apparatus 100 includes a receiver 100, a controller 120, and a video processor 130.

The receiver 100 may receive content to for displaying on the display apparatus 100 and metadata that may include, for example, genre information of the content.

The content recited herein includes at least one of a video and an audio and is created to be replayed via the display apparatus 100, and may include various kinds of genres such as news, a drama, a commercial, a movie, a sport, a documentary, a music concert, education, a current topic, etc.

The contents of various genres, and the metadata including the genre information of the contents, may be provided to the display apparatus 100 in various methods, and the receiver 100 may receive the contents and the metadata.

For example, when the contents of various genres and the metadata including the genre information of the contents are provided via a broadcast signal and the broadcast signal is transmitted via a transmission antenna of a broadcasting station, the receiver 100 may include an antenna and a tuner. Alternatively, when the broadcast signal is provided via a cable, the receiver 100 may be implemented such that the receiver 100 is able to receive a cable signal.

The broadcast signal may include the contents of various genres and may include the metadata that includes the genre information of the contents in the form of Electronic Program Guide (EPG) information. Therefore, the receiver 100 may receive the contents and the metadata including the genre information of the contents by receiving such a broadcast signal.

A detailed configuration of the receiver 110 for receiving the broadcast signal may be implemented using a well-known technology. Thus, a detailed description thereof is omitted.

The video processor 130 may process a video of the received content under the control of the controller 120. Specifically, the content received via the receiver 110 is divided into a video signal and an audio signal by a processing operation. The video processor 130 may perform various signal processing operations with respect to the video signal.

In particular, the video processor 130 may process the video of the content by using a video setting value on a video mode corresponding to the genre of the content under the control of the controller 120. The video setting value may refer to a setting value on the video, such as color temperature, definition, contrast, brightness, etc., which may be pre-defined for each video mode corresponding to a content genre.

In addition, the video processor 130 may perform various video processing operations such as scaling, noise filtering, frame rate conversion, resolution conversion, etc.

The controller 120 controls an overall operation of the display apparatus 100. In particular, the controller 120 may extract the genre information of the content from the received metadata, analyze the content, calculate reliability of the genre information of the content, and control the video processor 130 to process the video of the content according to a result of the calculating the reliability. To achieve this, the display apparatus 100 may store genre identification characteristic values corresponding to a plurality of content genres, and video setting values for a plurality of video modes corresponding to the plurality of content genres.

Specifically, the controller 120 may extract the genre information of the content included in the metadata. In addition, the controller 120 may analyze the content and acquire content information that includes a genre identification characteristic value corresponding to the genre of the content.

In this case, the genre identification characteristic included in the content information may include at least one of a shot characteristic, a motion characteristic, a brightness characteristic, a color characteristic, an edge characteristic, a text characteristic, a saturation characteristic related to the video of the content, a Mel-Frequency Cepstral Coefficients (MFCC) characteristic, a periodicity characteristic, an energy characteristic, a Zero Crossing Rate (ZCR) characteristic, a pitch characteristic, and a frequency peak characteristic related to the audio of the content. The controller 120 may analyze at least one of the video and the audio of the received content and may acquire values of such genre identification characteristics.

The method for analyzing the content and acquiring the above-described genre identification characteristic values from the received content may use a well-known technology. Thus, a detailed description thereof is omitted.

In addition, the controller 120 may calculate reliability of the genre information of the content extracted from the metadata by comparing the genre identification characteristic value corresponding to the genre information of the content extracted from the metadata from among the stored genre identification characteristic values corresponding to the plurality of content genres, and the genre identification characteristic value acquired by analyzing the content.

For example, in response to a content and metadata including 'information indicating that the content is a sport genre' being received, the controller 120 may extract the 'information indicating that the content is the sport genre' from the received metadata. In addition, the controller 120 may acquire a value for at least one of a shot characteristic, a motion characteristic, a brightness characteristic, a color characteristics, an edge characteristic, a text characteristic, and a saturation characteristic from a video of the content by analyzing the received content, and may acquire a value for at least one of an MFCC characteristic, a periodicity characteristic, an energy characteristic, a ZCR characteristic, a pitch characteristic, and a frequency peak characteristic from an audio.

Thereafter, the controller 120 may calculate the reliability of the 'information indicating that the content is the sport genre' as a probability, by comparing a genre identification characteristic value corresponding to the sport genre from among the stored characteristic values of the video and audio for the plurality of content genres, that is, from among the stored genre identification characteristic values for each genre, and the genre identification characteristic value acquired by analyzing the content.

The characteristic value recited herein refers to a value regarding at least one characteristic. Therefore, the stored characteristics values of the video and audio on the plurality of content may be plural in number for each genre, and the genre identification characteristic value acquired by analyzing the content may be plural in number. The controller 120 may calculate the reliability of the 'information indicating that the content is the sport genre' by using a well-known classification algorithm such as a Support Vector Machine (SVM), a Probabilistic Neutral Network (PNN), and a Vector Quantization Neutral Network (VQN).

However, the method for calculating the reliability is not limited to this. For example, the controller 120 may compare the genre identification characteristic values acquired by analyzing the content and the stored genre identification characteristic values corresponding to the sport genre, and, when all of the genre identification characteristic values are consistent with each other, the reliability of the 'information indicating that the content is the sport genre' is 100%, and, when none of the genre identification characteristic values are consistent with each other, the reliability is 0%. In addition, when some of the genre identification characteristic values are consistent with each other, the reliability is calculated as a probability between 0% and 100% in proportion to the number of consistent characteristic values.

The controller 120 may determine the genre of the content according to the calculated reliability, and may control the video processor 130 to process the video of the content by using the video setting value on the video mode corresponding to the determined genre of the content from among the stored video setting values on the plurality of video modes corresponding to the plurality of content genres.

The video setting value on the video mode corresponding to each of the plurality of content genres refers to a screen setting value such as color temperature, brightness, contrast, definition, resolution, aspect ratio, etc., which is pre-defined for each video mode corresponding to each genre. Based on the video setting value, the most appropriate video can be displayed according to the genre of the content, Accordingly, when a first video mode corresponds to a sport genre and a second video mode corresponds to a news genre, for example, and the received content is the sport genre, the controller 120 controls the video processor 130 to process the video of the content by using a stored video setting value on the first video mode corresponding to the sport genre, so that a video optimized for the sport genre content can be provided.

Figure 2:
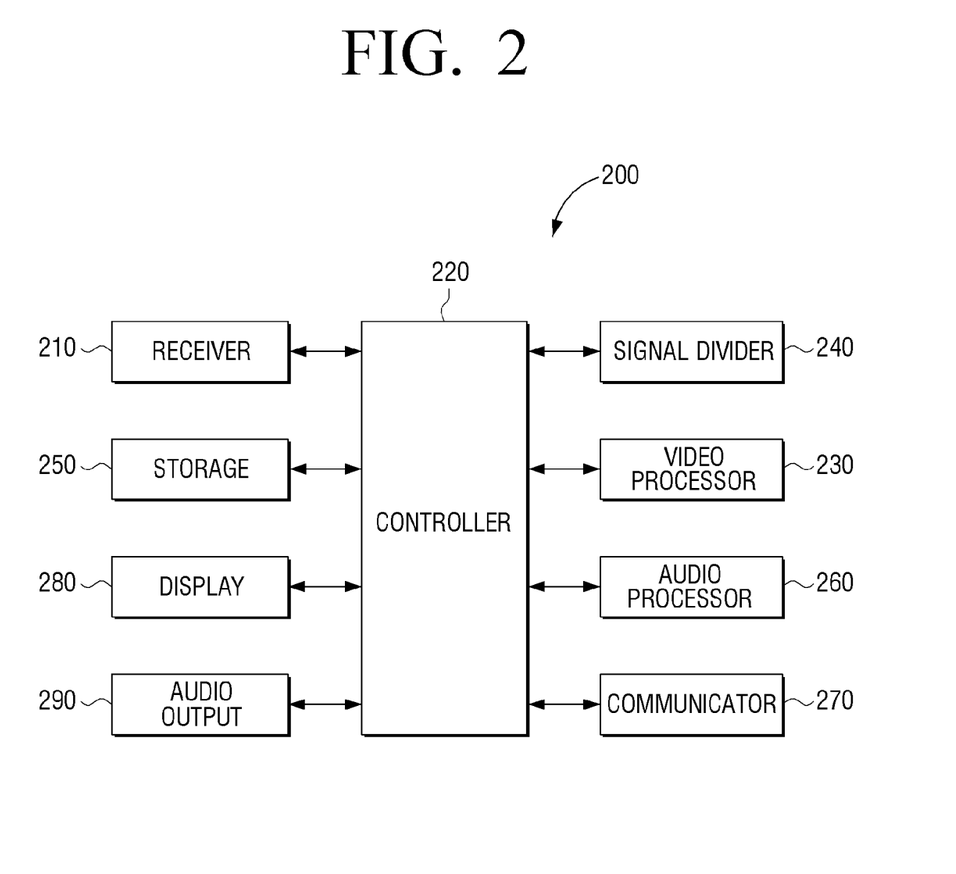
FIG. 2 is a block diagram illustrating a configuration of a display apparatus in detail according to an exemplary embodiment.

Hereinafter, a configuration and operation of a display apparatus according to various exemplary embodiments will be explained with reference to FIG. 2. FIG. 2 is a block diagram illustrating a configuration of a display apparatus in detail according to an exemplary embodiment. Referring to FIG. 2, the display apparatus 200 includes a receiver 210, a controller 220, a video processor 230, a signal divider 240, a storage 250, an audio processor 260, a communicator 270, a display 280, and an audio output 290.

The video processor 230 may process a video of a content and output the video processed by the video processor 230 to the display 280 in the same way as that of the video processor 130 of FIG. 1 described above.

The signal divider 240 may divide the received content and metadata including genre information of the content into a video signal, an audio signal, and metadata. For example, when a content is received via a broadcast signal, the broadcast signal may include EPG information including the broadcast content and genre information of the content. In this case, the signal divider 240 may divide the broadcast signal received via the receiver 210 into a video signal, an audio signal, and EPG data including the genre information of the content.

The storage 250 may store various programs and data for driving the display apparatus 200. In particular, the storage 250 may store genre identification characteristic values corresponding to a plurality of content genres, by which the controller 220 calculates reliability of the genre information of the content extracted from the metadata and calculates a probability for each of the plurality of content genres. In addition, the storage 250 may store video and audio setting values for a plurality of video and audio modes corresponding to the plurality of content genres, such that video and audio of the content are processed according to the calculated reliability, and also may store video and audio setting values for a default mode, that is, predetermined video and audio modes.

Figure 3:
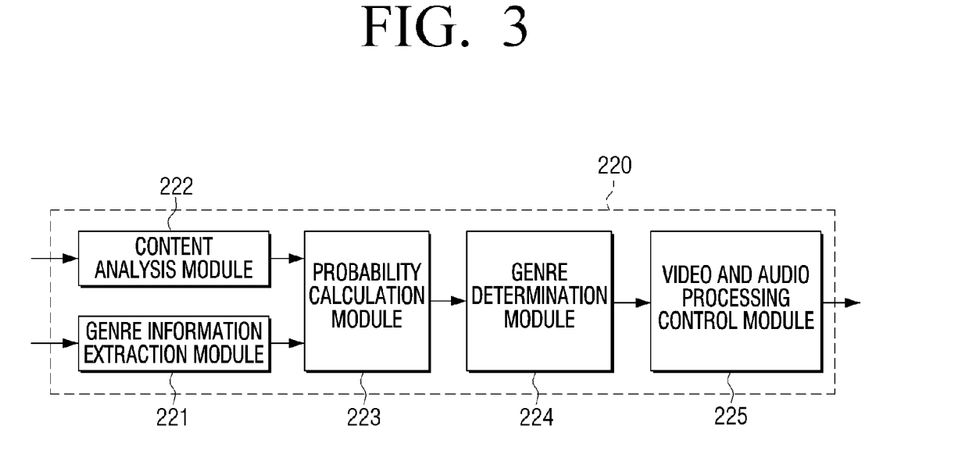
FIG. 3 is a view illustrating a program module according to an exemplary embodiment.

In addition, the storage 250 may store program modules shown in FIG. 3. Referring to FIG. 3, the storage 250 may store a genre information extraction module 221, a content analysis module 222, a probability calculation module 223, a genre determination module 224, and a video and audio processing control module 225. Each module will be explained in detail when the controller 220 is explained with reference to FIG. 3

The term "module" as used herein means, but is not limited to, a software or hardware component, such as an FPGA or ASIC, which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

According to another exemplary embodiment, the storage 250 may include a training module. The training module forms a model for each content genre which is expressed by genre identification characteristic values corresponding to content genres through training which uses a sample for each of the plurality of content, and may store the model in the storage 250.

The audio processor 260, as shown in FIG. 2, may process the audio of the received content under the control of the controller 220. Specifically, in response to the content received via the receiver 210 being divided into the video, audio, and data by the signal divider 240, the audio processor 260 may perform various signal processing operations such as amplification and noise filtering to the audio signal. In particular, the audio processor 260 may process the audio of the content by using the audio setting value on the audio mode corresponding to the genre of the content under the control of the controller. The audio signal processed by the audio processor 260 may be output to the audio output 290.

The audio setting value on the audio mode corresponding to the genre of the content refers to an audio setting value which is pre-defined for each audio mode corresponding to each content genre, such as an equalizer setting value. Accordingly, based on the audio setting value, the most appropriate audio can be reproduced according to the genre of the content.

The communicator 270 is an element for communicating with an external server. In particular, the communicator 270 may receive the metadata that includes the genre information of the content received from the external server.

For example, when broadcast content is provided to the display apparatus 200 via a set-top box, the broadcast content is provided to the display apparatus 200 via the set-top box, whereas the metadata including the genre information of the content is separately provided from the external server. In this case, the communicator 270 may receive the metadata including the genre information of the content provided from the external server.

The display 280 may display the video. In particular, the display 280 may display the video of the content processed by the video processor 230. To achieve this, the display 280 may be implemented by using a Liquid Crystal Display (LCD) panel, an Organic Light Emitting Diode (OLED), etc., but is not limited to these.

The audio output 290 may output the audio of the content processed by the audio processor 260. To achieve this, the audio output 290 may include a speaker, etc.

The controller 220 controls an overall operation of the display apparatus 200. In particular, in response to the content and the metadata including the genre information of the content being received via the receiver 210, the controller 220 may extract the genre information of the content from the metadata, analyze the received content, and calculate reliability of the genre information of the content. In addition, the controller 220 may control the video processor 230 and the audio processor 260 to process the video and audio of the content according to the calculated reliability.

Hereinafter, the operation of the controller 220 will be explained in detail with reference to FIGS. 3 through 6. FIG. 3 is a view illustrating the operation of the controller 220 using the program modules stored in the storage 250 according to an exemplary embodiment. Referring to FIG. 3, the controller 220 may control the display apparatus 200 via the genre information extraction module 221, the content analysis module 222, the probability calculation module 223, the genre determination module 224, and the video and audio processing control module 225 which are stored in the storage 250.

The arrows illustrated in FIG. 3 indicate a flow of the content and the metadata including the genre information of the content received via at least one of the receiver 210 and the communicator 270 for processing in each module.

According to an exemplary embodiment, in response to a signal including the content and the metadata being received via the receiver 210, the signal divider 240 separates the video, audio, and metadata including the genre information of the content from the received signal. The video and audio of the content is processed through the content analysis module 222, and the metadata including the genre information of the content is processed through the genre information extraction module 221.

According to another exemplary embodiment, the content and the metadata including the genre information of the content may be provided to the display apparatus 200 via different paths as described above in the explanation of the communicator 270. In this case, the content received via the receiver 210 may be divided into the video and the audio by the signal divider 240 and then may be processed through the content analysis module 222, and the metadata including the genre information of the content received from the external server via the communicator 270 may be processed through the genre information extraction module 221.

Specifically, the genre information extraction module 221 may extract the genre information of the currently received content from the metadata including the genre information of the content transmitted from the signal divider 240 or the communicator 270. The genre information of the content is information such as EPG information indicating a genre of a broadcast content broadcasted in each timeslot and may include news, a drama, a commercial, a movie, a sport, a documentary, a music concert, education, a current topic, etc. However, this should not be considered as limiting. The metadata including the genre information of the content is not necessarily limited to the EPG information.

The content analysis module 222 may acquire a genre identification characteristic value from the video and audio of the content transmitted from the signal divider 240. This has been described above in the explanation of the controller of FIG. 1.

The probability calculation module 223 may calculate the reliability of the genre information of the content as a probability by comparing the genre information of the content extracted through the genre information extraction module 221 and the genre identification characteristic value acquired through the content analysis module 222.

Specifically, the probability calculation module 223 may acquire from the storage 250 the genre identification characteristic values corresponding to the genre information of the content extracted through the genre information extraction module 221 from among the genre identification characteristic values corresponding to the plurality of content stored in the storage 250. The probability calculation module 223 may then compare these genre identification characteristic values and the genre identification characteristic values of the really received content, which are acquired through the content analysis module 222, and calculate the reliability of the genre information of the content extracted from the genre information extraction module 221 as a probability. In this case, various classification algorithms such as SVM, PNN, and VQN may be used as described above.

Figure 4:
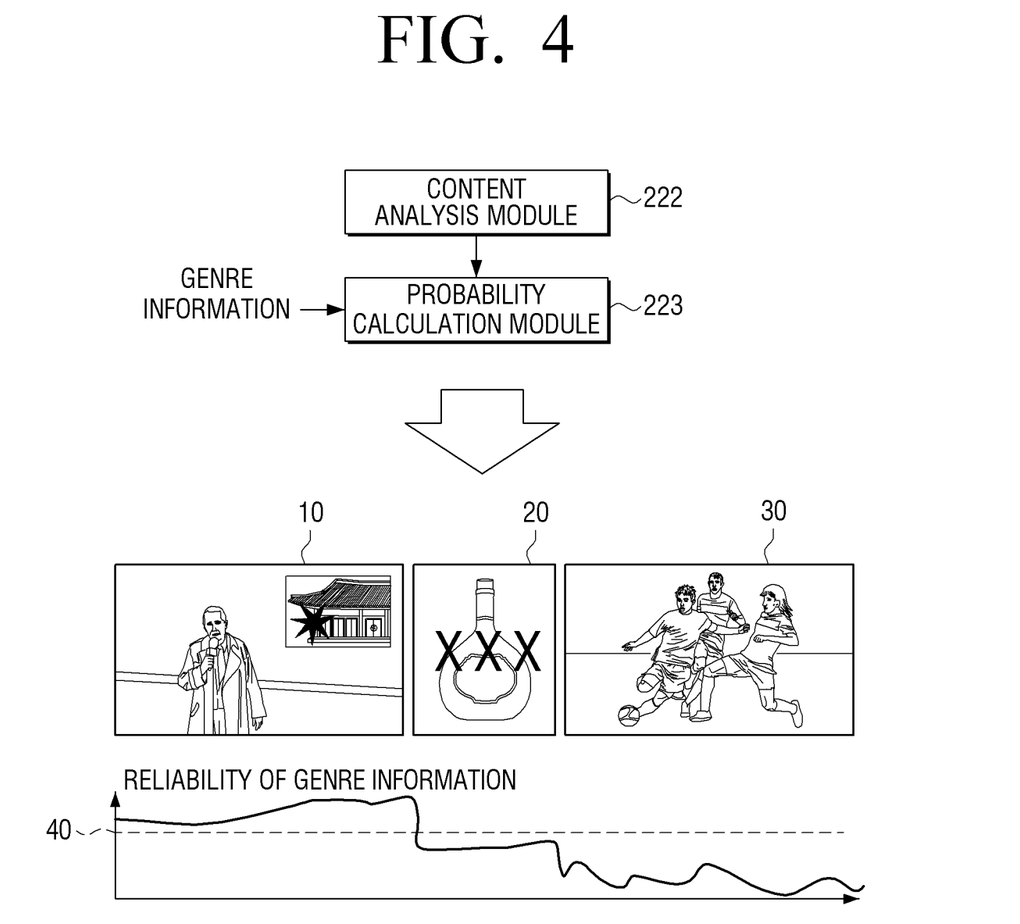
FIGS. 4 and 5 are views illustrating a method for calculating reliability and a probability according to an operation of a controller according to an exemplary embodiment.

FIG. 4 is a view illustrating an exemplary embodiment in which the probability calculation module 223 calculates reliability of genre information of a content extracted through the genre information extraction module 221.

In the graph shown in the undermost portion of FIG. 4, the horizontal axis indicates a time and the vertical axis indicates reliability of genre information of a content included in metadata. That is, the graph of FIG. 4 shows the reliability of the genre information of the content calculated by the probability calculation module 223 with time. In addition, although real contents are received in order of news 10, a commercial 20, and a sport 30 with time, the genre information of the content included in the received metadata is fixed to the news. That is, there is an error in the metadata including the genre information of the received content.

For example, in the case of EPG information regarding broadcast content, the EPG information may include genre information of a content broadcasted in each timeslot. However, when a live broadcast finishes past its scheduled time or when unscheduled breaking news is broadcasted, or when the EPG information gives wrong information, the content really broadcasted at a scheduled time may be different from the EPG information.

In this case, referring to FIG. 4, the genre information extraction module 221 extracts the genre information 'news' from the received metadata and transmits the genre information to the probability calculation module 223. The content analysis module 222 analyzes the actually received content, extracts characteristic values of the video and audio, and transmits the characteristic values to the probability calculation module 223.

Accordingly, the probability calculation module 223 acquires characteristic values of the video and audio corresponding to the news 10 from the storage 250, compares these characteristic values and the characteristic values of the video and audio of the real content transmitted from the content analysis module 222, and calculates the reliability of the genre information 'news'.

Referring to the graph of FIG. 4, in the section in which the actually received content is the news 10, the genre identification characteristic values corresponding to the news genre, which are stored in the storage 250, and the genre identification characteristic values of the really received content are consistent with each other or similar to each other. Therefore, it can be seen from the graph that the reliability of the genre information 'news' included in the metadata is high.

Thereafter, in the sections in which the actually received content is the commercial 20 and the sport 30, the genre identification characteristic values acquired by the content analysis module 222 are different from those of the news genre. Therefore, the reliability of the genre information 'news' is low. As described above, the probability calculation module 223 can calculate the reliability of the genre information of the content included in the metadata.

The genre determination module 224 may determine the genre of the currently received content according to the reliability of the content genre information calculated in the probability calculation module 223. Specifically, in response to the reliability exceeding a predetermined value, the genre determination module 224 may determine that the genre indicated by the genre information of the content is the genre of the currently received content. Alternatively, in response to the reliability being less than the predetermined value, the genre determination module 224 may determine that the genre indicated by the genre information of the content is not the genre of the currently received content.

Referring to the graph in the example of FIG. 4, in response to the reliability of the genre information 'news' being exceeding a predetermined value (40), the genre determination module 224 may determine that the genre of the currently received content is news. In addition, in response to the reliability being less than the predetermined value 40, the genre determination module 224 determines that the genre of the currently received content is not the news.

The video and audio processing control module 225 controls the video processor 230 and the audio processor 260 to process the video and audio of the content according to a result of the determining by the genre determination module 224.

Specifically, in response to determining that the genre indicated by the genre information of the content is the genre of the currently received content, the video and audio processing control module 225 may control the video processor 230 and the audio processor 260 to process the video and audio of the currently received content according to video and audio modes corresponding to the genre indicated by the genre information of the content, from among the plurality of video and audio modes stored in the storage 250.

In addition, in response to determining that the genre indicated by the genre information of the content is not the genre of the currently received content, the video and audio processing control module 225 may control the video processor 230 and the audio processor 260 to process the video and audio of the currently received content according to a predetermined video mode and a predetermined audio mode stored in the storage 250, that is, according to a default mode.

According to another exemplary embodiment, the probability calculation module 223 may further calculate a probability on each of the plurality of content genres by comparing genre identification characteristic values corresponding to the plurality of content genres stored in the storage 250 and genre identification characteristic values of the really received contents transmitted from the content analysis module 222.

Figure 5:
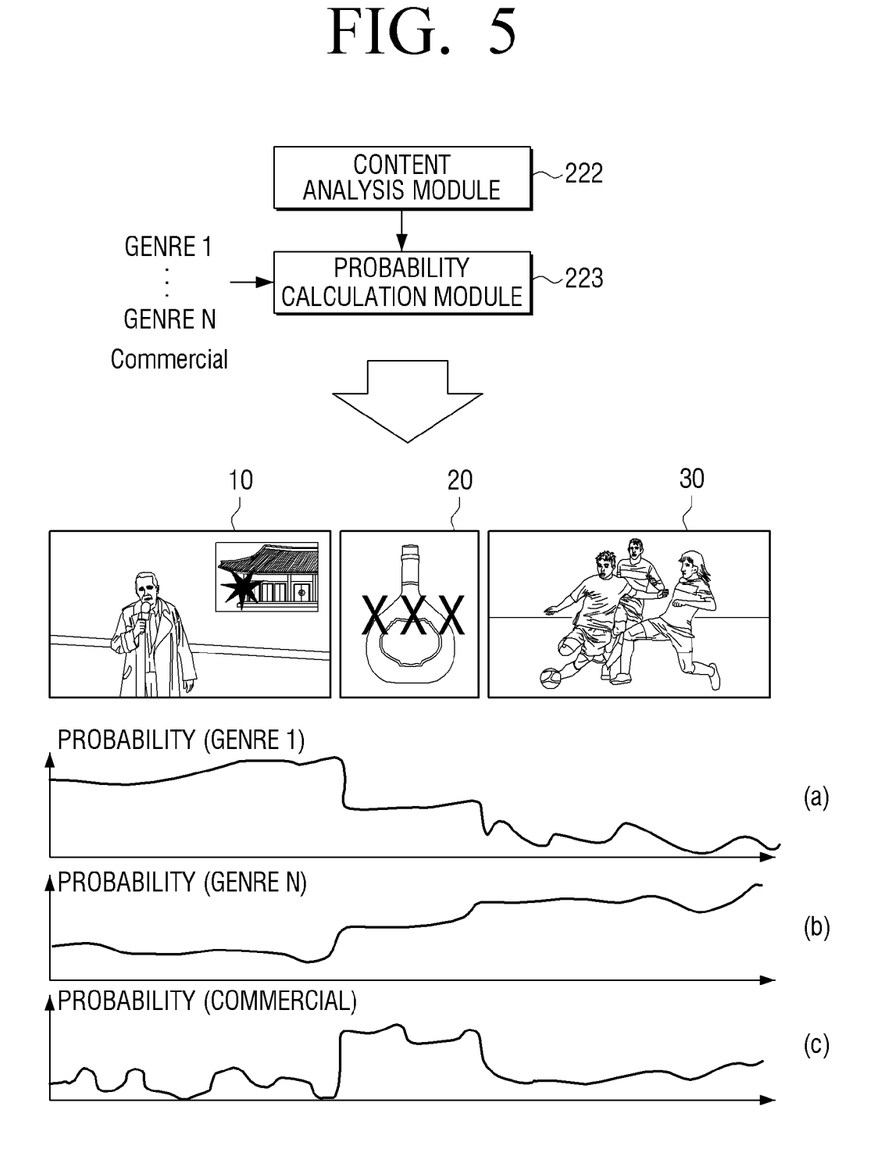

FIG. 5 is a view illustrating an exemplary embodiment in which the probability calculation module 223 calculates a probability on each of the plurality of content genres. Graph (a) of FIG. 5 shows a result of calculating a probability that the received content is genre 1, graph (b) shows a result of calculating a probability that the received content is genre N, and graph (c) shows a result of calculating a probability that the received content is a commercial. In the example of FIG. 5, genre 1 indicates a news genre and genre N indicates a sport genre.

Referring to FIG. 5, in response to the news 10 being received, the probability calculation module 223 calculates a probability that the currently received content is genre 1, a probability that the currently received content is genre N, and a probability that the currently received content is a commercial, respectively, by comparing genre identification characteristic values on each of genres 1 to N and commercial stored in the storage 250 and genre identification characteristic values on the currently received news 10 which are acquired by the content analysis module 222.

In this method, in response to the commercial 20 being received and in response to the sport 30 being received, the probability calculation module 223 may calculate a probability that the content received at the corresponding time is genre 1, a probability that the content received at the corresponding time is genre N, and a probability that the content received at the corresponding time is a commercial.

Accordingly, referring to graphs (a) to (c) of FIG. 5, in the section in which the news 10 is received, graph (a) of FIG. 5, that is, the result of calculating the probability that the received content is genre 1 (news genre) has the highest probability section. In addition, in the section in which the commercial 20 is received, graph (c) of FIG. 5, that is, the result of calculating the probability that the received content is a commercial has the highest probability section. In addition, in the section in which the sport 30 is received, graph (b) of FIG. 5, that is, the result of calculating the probability that the received content is genre N (sport genre) has the highest probability section.

In the exemplary embodiment in which the probability calculation module 223 further calculates the probability on each of the plurality of content genres, the genre determination module 224 may determine the genre of the currently received content according to the reliability of the genre information of the content calculated by the probability calculation module 223 in a different method from that described in the exemplary embodiment of FIG. 4.

Specifically, in response to the reliability of the genre information of the content exceeding a predetermined value, the genre determination module 224 determines that the genre indicated by the genre information of the content is the genre of the currently received content, and, in response to the reliability of the genre information of the content being less than the predetermined value, the genre determination module 224 may determine that the content genre having the highest probability from among the probabilities on the plurality of content genres is the genre of the currently received genre.

Particularly, in FIG. 4, when the content genre information indicates 'news' and the actually received content is news 10, the reliability of the content genre information calculated by the probability calculation module 223 exceeds the predetermined value 40. Therefore, the genre determination module 224 determines that the genre of the really received content is 'news'.

However, in the section in which the content really received thereafter is the commercial 20, the reliability of the content genre information 'news' is less than the predetermined value 40. Therefore, the genre determination module 224 determines the case of graph (c) having the highest probability in the corresponding section from among the probabilities on the plurality of content genres calculated by the probability calculation module 223, that is, the commercial, as the genre of the really received content.

In addition, in the section in which the content actually received thereafter is the sport 30, the genre determination module 224 determines the case of graph (b) of FIG. 5, that is, the sport, as the genre of the actually received content in the same method.

In the exemplary embodiment in which the probability calculation module 223 further calculates the probability on each of the plurality of content genres, the genre determination module 224 can determine the genre of the content even when the reliability is less than the predetermined value unlike in the exemplary embodiment in which only the reliability of the genre information of the content is calculated. Therefore, the video and audio processing control module 225 may control the video processor 230 and the audio processor 260 to process the video and audio of the received content according to the video and audio modes corresponding to the genre of the content determined by the genre determination module 225, rather than according to the default mode.

Figure 6:
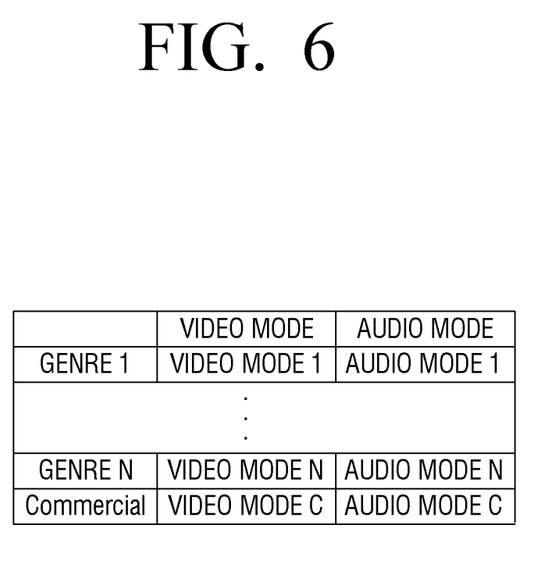
FIG. 6 is a view illustrating an example of a video and audio mode varying according to a genre of a content.

FIG. 6 is a view illustrating different video and audio modes set for each of the plurality of content genres. Referring to FIG. 6, genre 1 corresponds to video mode 1 and audio mode 1, genre N corresponds to video mode N and audio mode N, and a commercial corresponds to video mode C and audio mode C.

As described above, video and audio modes suitable for reproducing content may be set for each of the plurality of content genres in the form of a table and may be stored in the storage 250.

In each of the video and audio modes, screen setting values regarding videos such as color temperature, brightness, contrast, definition, resolution, aspect ratio, and setting values such as highlight on a spectrum regarding audios or equalizer setting value may be appropriately set for each genre.

Accordingly, the video and audio processing control module 225 may control the video processor 230 and the audio processor 260 to process the video and audio of the received content according to video and audio modes corresponding to the genre which is determined by the genre determination module 224.

In the above-described exemplary embodiment, the content and the metadata including the genre information of the content may be received via the receiver 210 altogether or the metadata including the genre information of the content may be received from an external server via the separate communicator 270. In this case, the reliability of the genre information of the content is calculated and the video and audio of the content is processed according to the reliability as described above.

However, the metadata including the genre information of the content may not be provided to the display apparatus 200 like the case in which the content is provided via a recording medium such as a Compact Disc (CD), a Digital Versatile Disc (DVD), a Blu-ray disc, etc., In this case, because there is no genre information of the content, it is impossible to calculate reliability of the genre information of the content.

However, according to the exemplary embodiment in which the probability calculation module 223 further calculates the probability on each of the plurality of content genres, it is possible to calculate a probability that the received content is each of the plurality of content and thus determine the genre having the highest probability as the genre of the content. Therefore, even when the metadata including the genre information of the content is not provided to the display apparatus 200, the display apparatus 200 can provide a screen and a sound suitable for the genre of the content by processing the video and audio of the content according to the video and audio modes corresponding to the determined genre of the content.

Figure 7:
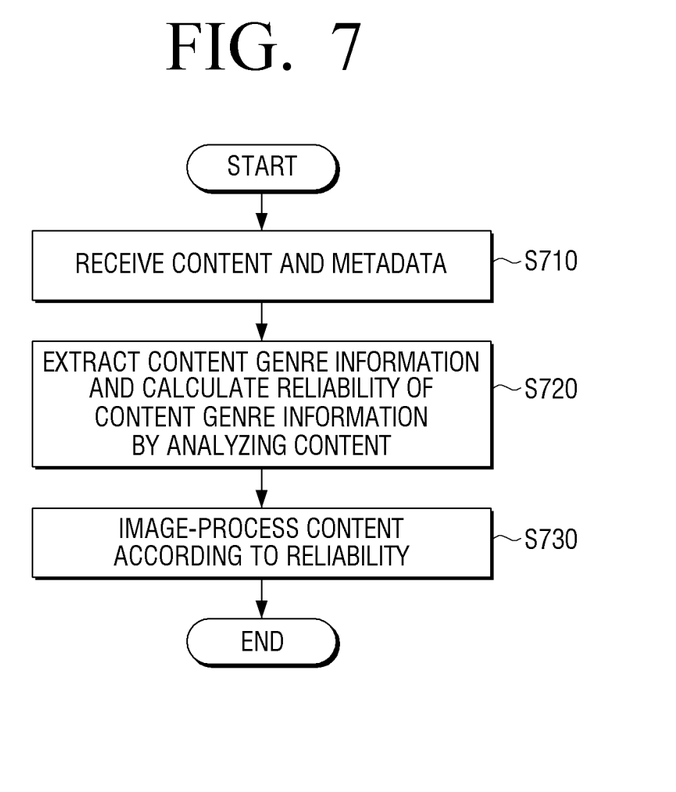
FIG. 7 is a flowchart illustrating a control method of a display apparatus according to an exemplary embodiment.

FIG. 7 is a flowchart illustrating a control method of a display apparatus 100 according to an exemplary embodiment. Referring to FIG. 7, in response to a content and metadata including genre information of the content being received (S710), the display apparatus 100 extracts the genre information of the content from the metadata, and calculates reliability of the genre information by analyzing the content (S720). Thereafter, the display apparatus 100 processes a video of the content according to the calculated reliability (S730).

Figure 8:
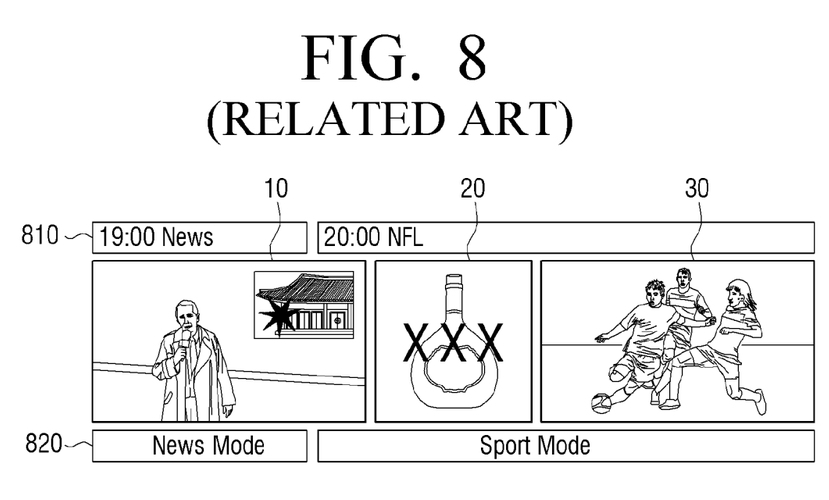
FIG. 8 is a view illustrating a case in which video and audio modes are set according to metadata.
Figure 9:
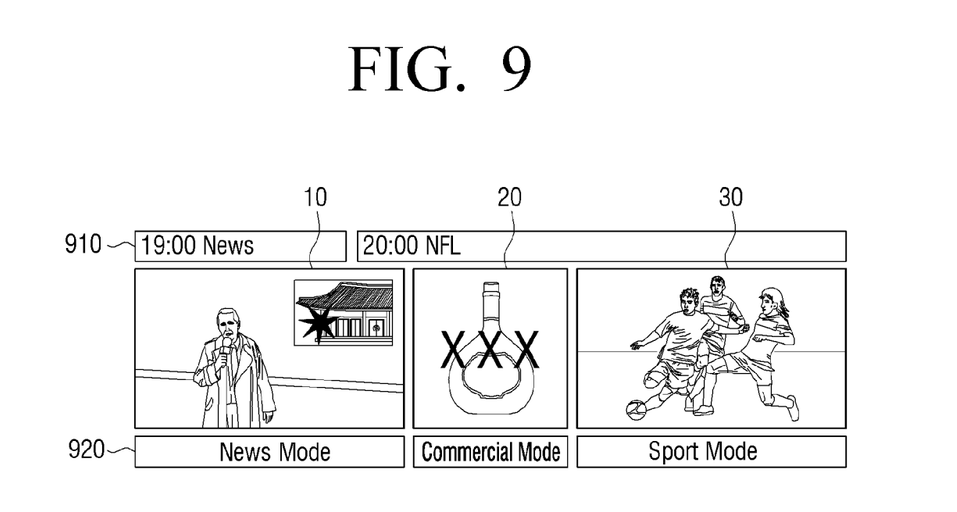
FIG. 9 is a view illustrating a case in which video and audio modes are set according to an exemplary embodiment.

FIGS. 8 and 9 are views that can be compare an effect according to an exemplary embodiment and an effect of a related-art method. Particularly, FIG. 8 illustrates a case in which video and audio modes are set in a related-art method. FIG. 9 illustrates a case in which video and audio modes are set according to an exemplary embodiment.

Specifically, referring to FIG. 8, EPG information 810 indicates that news will be broadcasted from 19:00 until 20:00 and National Football League (NFL) will be broadcasted beginning at 20:00. However, the actually broadcasted content is news 10 which finishes after 20:00 followed by a commercial 20 and then the NFL 30 which begins broadcasting past 20:00. That is, there is a discrepancy in the EPG information 810 which is the metadata including the genre information of the content. In this case, according to the related-art method, video and audio of the content are processed according to the EPG information 810 as indicated by reference numerals 820.

Alternatively, according to an exemplary embodiment as shown in FIG. 9, the display apparatus calculates reliability of the genre information of the content and processes the video and audio according to a result of the calculating the reliability. Therefore, the error of the metadata is corrected and the video and audio are processed according to the genre of the really broadcasted content as indicated by reference numeral 920 despite the erroneous EPG information 910. According to the various exemplary embodiments described above, even when there is an error in the genre information of the content included in the metadata of the content, the genre of the reproduced content can be exactly determined by using a result of calculating the reliability of the genre information of the content, so that the user can view the content with the video and audio optimized for the genre of the content, exactly and easily.

The operation of the controller of the display apparatus and the control methods of the display apparatus according to the above-described various exemplary embodiments may be generated as software and may be mounted in the display apparatus.

Specifically, a program for extracting genre information of a content from a metadata in response to the content and the metadata including the genre information of the content being received, calculating reliability of the genre information of the content by analyzing the content, and processing a video of the content according to the calculated reliability may be installed in a non-transitory computer readable medium.

The non-transitory computer readable medium refers to a medium that stores data semi-permanently rather than storing data for a very short time, such as a register, a cache, and a memory, and is readable by an apparatus. Specifically, the above-described various middleware or programs may be stored in a non-transitory computer readable medium such as a compact disc (CD), a digital versatile disk (DVD), a hard disk, a Blu-ray disk, a universal serial bus (USB), memory stick, a memory card, and a read only memory (ROM), and may be provided. Furthermore, it is understood that the components and elements of the above-described apparatuses may include circuitry, at least one processor, memory, etc.

The foregoing exemplary embodiments and advantages are merely exemplary and are not to be construed as limiting. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a receiver receiving a content and metadata including genre information of the content;
   a controller calculating reliability of the genre information by comparing the genre information and a genre identification characteristic obtained by analyzing the content;
   a video processor receiving the content received by the receiver and the reliability calculated by the controller, processing a video of the content by adjusting at least one of color temperature, contrast, and aspect ratio of data representing the video of the content according to the calculated reliability to provide a reliability-adjusted video data stream; and
   a display screen outputting a viewable image from the reliability-adjusted video data stream,
   wherein the genre information and the genre identification characteristic both correspond to the content received by the receiver,
   wherein the video processor, in response to the reliability of the genre information being greater than a predetermined value, processes the video of the content according to a video mode corresponding to the genre of the content, and
   wherein the video processors, in response to the reliability of the genre information being less than the predetermined value, processes the video of the content according to a first video mode or a second video mode, wherein the first video mode is a default video mode, and wherein the second video mode is a mode corresponding to a genre of a highest probability from among a plurality of content genres.

2. The display apparatus of claim 1, further comprising:
   a storage configured to store genre identification characteristic values corresponding to a plurality of content genres, and
   wherein the controller further calculates the reliability of the genre information by comparing a first genre identification characteristic value corresponding to the genre information, which is acquired from the storage, and a second genre identification characteristic value which is acquired by analyzing the content.

3. The display apparatus of claim 2, wherein the first genre identification characteristic value and the second genre identification characteristic value comprises at least one of a shot characteristic, a motion characteristic, a brightness characteristic, a color characteristic, an edge characteristic, a text characteristic, and a saturation characteristic related to the video of the content.

4. The display apparatus of claim 1, further comprising:
   a communicator communicating with an external server, wherein the metadata comprising the genre information is received from the external server.

5. The display apparatus of claim 1, further comprising:
   an audio processor processing an audio of the content,
   wherein the storage is further configured to store audio setting values for a plurality of audio modes corresponding to the plurality of content genres,
   wherein the controller further controls the video processor and the audio processor to process the video and the audio of the content by using one of the video setting values on the video mode from the plurality of video modes and an audio setting value on an audio mode corresponding to the obtained genre of the content.

6. The display apparatus of claim 1, wherein the content is a broadcast content, and the metadata is Electronic Program Guide (EPG) information of the broadcast content.

7. A control method of a display apparatus, the control method comprising:
   receiving a content and metadata including genre information of the content;
   determining reliability of the genre information of the content, in response to receiving the content, by comparing the genre information and a genre identification characteristic obtained by analyzing the content;
   processing a video of the content by adjusting at least one of color temperature, contrast, and aspect ratio of data representing the video of the content according to the calculated reliability to provide a reliability-adjusted video data stream; and
   displaying a viewable image using the reliability-adjusted video data stream on a display screen,
   wherein the genre information and the genre identification characteristic both correspond to the received content,
   wherein the processing the video of the content comprises:
   processing, in response to the reliability of the genre information being greater than a predetermined value, the video of the content according to a video mode corresponding to the genre of the content, and
   processing, in response to the reliability of the genre information being less than the predetermined value, the video of the content according to a first video mode or a second video mode, wherein the first video mode is a default video mode, and wherein the second video mode is a mode corresponding to a genre of a highest probability from among a plurality of content genres.

8. The control method of claim 7, wherein the determining the reliability of the genre information of the content comprises:
   calculating the reliability by comparing a first genre identification characteristic value corresponding to the genre information, which is acquired from among pre-stored genre identification characteristic values corresponding to a plurality of content genres, and a second genre identification characteristic value which is acquired by analyzing the content.

9. The control method of claim 8, wherein the first genre identification characteristic value and the second genre identification characteristic value comprises at least one of a shot characteristic, a motion characteristic, a brightness characteristic, a color characteristic, an edge characteristic, a text characteristic, and a saturation characteristic related to the video of the content.

10. The control method of claim 7, wherein the metadata comprising the genre information is received from an external server.

11. The control method of claim 7, further comprising:
   processing an audio of the content by using an audio setting value on an audio mode corresponding to the obtained genre, which is acquired from among pre-stored audio setting values on a plurality of audio modes corresponding to the plurality of content genres.

12. The control method of claim 7, wherein the content is a broadcast content, and the metadata is Electronic Program Guide (EPG) information of the broadcast content.

\* \* \* \* \*